Figure 1:
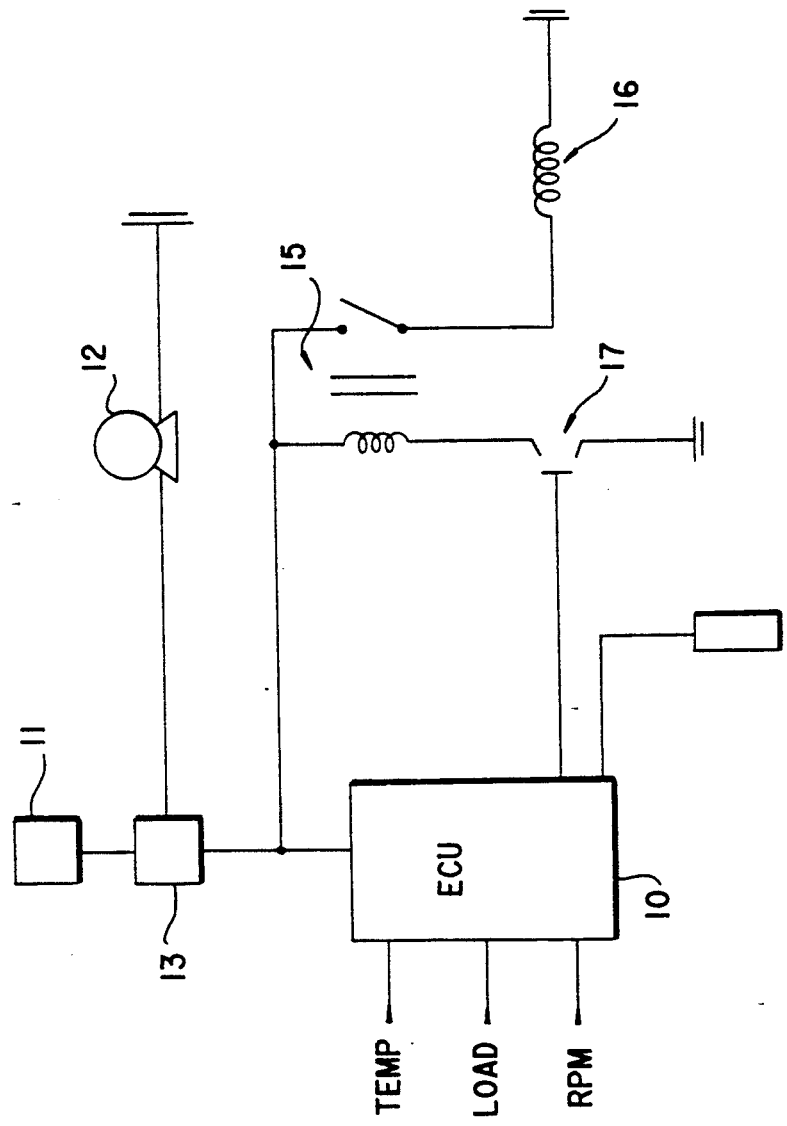

United States Patent [19]
Smith

[11] Patent Number: 5,265,418
[45] Date of Patent: Nov. 30, 1993

[54] EXHAUST EMISSION CONTROL

[75] Inventor: Darren A. Smith, Doubleview, Australia

[73] Assignee: Orbital Engine Company (Australia) Pty Limited, Balcatta, Australia

[21] Appl. No.: 916,878

[22] PCT Filed: Feb. 27, 1991

[86] PCT No.: PCT/AU91/00066
§ 371 Date: Aug. 13, 1992
§ 102(e) Date: Aug. 13, 1992

[87] PCT Pub. No.: WO91/13247
PCT Pub. Date: Sep. 5, 1991

[30] Foreign Application Priority Data

Feb. 27, 1990 [AU] Australia .................. PJ8828

[51] Int. Cl.⁵ .................. F01N 3/00; F02N 17/02; F01P 7/14
[52] U.S. Cl. .................. 60/284; 60/300; 123/142.5 R; 123/41.08
[58] Field of Search .................. 123/179.15, 179.28, 123/142.5 R, 41.1, 41.08; 123/339, 549, 556; 60/274, 276, 300, 284, 286

[56] References Cited

U.S. PATENT DOCUMENTS

| | | | |
|---|---|---|---|
| 3,855,975 | 12/1974 | Masaki et al. | 123/41.13 |
| 4,102,127 | 7/1978 | Saiki et al. | 60/300 |
| 4,805,403 | 2/1989 | Bowman et al. | 123/142.5 R |
| 4,944,260 | 7/1990 | Shea et al. | 123/556 |
| 5,048,467 | 9/1991 | Kojima | 123/41.08 |
| 5,054,459 | 10/1991 | Reimer et al. | 123/549 |
| 5,079,921 | 1/1992 | McCandless et al. | 123/323 |
| 5,163,290 | 11/1992 | Kinnear | 60/300 |
| 5,174,254 | 12/1992 | Humburg | 123/41.08 |
| 5,184,463 | 2/1993 | Becker et al. | 123/179.1 |
| 5,207,058 | 5/1993 | Sasaki et al. | 60/300 |

FOREIGN PATENT DOCUMENTS

| | | | |
|---|---|---|---|
| 59-165820 | 9/1984 | Japan | 123/41.1 |
| 60-43115 | 3/1985 | Japan | 60/286 |

Primary Examiner—E. Rollins Cross
Assistant Examiner—Thomas Moulis
Attorney, Agent, or Firm—Nikaido, Marmelstein, Murray & Oram

[57] ABSTRACT

A method of operating an internal combustion engine (20) in order to improve the control of the level of emissions in the exhaust gases, comprising the steps of, at least when the engine (20) is operating under idle and/or low load conditions at a temperature below a predetermined value, applying a parasitic load to the engine (20) to increase engine fuel demand, and increasing fueling rate to the engine (20) in response to said engine fuel demand to thereby raise the temperature of the exhaust gases. The method may further comprise the steps of raising the temperature of the air being inducted into the engine (20) and/or directly heating a catalyst (25) in the engine exhaust system (24), conveniently by respective heater elements (23,26) coupled to an alternator (27) driven by the engine (20).

22 Claims, 2 Drawing Sheets

EXHAUST EMISSION CONTROL

This invention relates to the controlling of the operation of internal combustion engines, in order to improve the control of the level of emissions in the exhaust gases, particularly during engine warm-ups.

It is recognised that it is generally more difficult to control the level of exhaust emissions and to achieve stable operation of an engine in the low load range, as compared with the higher ranges of engine load. It is also recognised that these difficulties increase when the engine is at a low operating temperature, such as may exist after an initial start up of the engine.

Further, in regard to engines operating with catalytic converters in the exhaust system, these catalysts do not become effective until they have reached an effective operating temperature generally referred to as "light off" temperature of the catalyst. This light off of the catalyst is generally dependent upon the heat input to the catalyst by the exhaust gases and this is dependent upon the exhaust gases being of a sufficiently high temperature to rapidly effect heating of the catalyst to light off temperature.

It is therefore the object of the present invention to provide a method and means for operating an internal combustion engine which will contribute to overcoming or reducing the above problems and to the achievement of improved control of the exhaust emissions.

With this object in view, there is provided according to the present invention, a method of operating an internal combustion engine, characterised by, at least when the engine is operating under idle and/or low load conditions at a temperature below a predetermined value, applying a parasitic load to the engine to increase engine fuel demand, and increasing fueling rate to the engine in response to said engine fuel demand to thereby raise the temperature of the exhaust gases.

By raising the temperature of the exhaust gases, the rate of rise of the operating temperature of the engine and of the temperature of the catalyst is increased, thus the engine reaches stable operating conditions more quickly and the period of time required to light off the catalyst is reduced, thus reducing the period of engine operation without effective treatment of the exhaust gases by the catalyst.

It will be appreciated that the use of the parasitic load is not always necessary at all engine start ups; as where the engine has previously been operating, the operating temperature of the engine and the temperature of the exhaust gases may be sufficiently high to achieve quickly effective operation of the engine and light off of the catalyst. Accordingly, in order to obtain improved fuel efficiency, the parasitic load is only applied to the engine when start up occurs while the temperature of the engine is below a predetermined value, that value being selected for the particular engine to be a temperature at which the engine will operate at an acceptable level of stability and light off of the catalyst will be achieved within a relatively short acceptable time interval from engine start up.

It has been found that the present invention is particularly relevant to the operation of two stroke cycle engines as such engines have less built in running loads and generally lower exhaust temperatures than four stroke cycle engines that incorporate valve mechanisms which apply a significant load to the engine. However, it is to be understood that the present invention does have application to engines operating on the four stroke cycle and will, in such engines, contribute to improvement in the stability of the engine operation and the effectiveness of the catalyst system.

The method of the present invention may be further characterised by raising the temperature of the air being inducted into the engine or directly heating the catalyst in the exhaust system. It is to be appreciated that the raising of the temperature of the inducted air will further contribute to increasing the rate of rise of the operating temperature of the engine, and raising the temperature of the exhaust gases, each of which will contribute to reducing the period required to obtain the effective operation of the exhaust system catalyst. Further, the direct heating of the exhaust system catalyst will also contribute to increasing the rate of rise of the temperature of the catalyst and to reducing the period required to light off the exhaust catalyst.

Although the load applied to the engine in accordance with the present invention is referred to as a parasitic load, it is to be understood that it is possible to make use of the energy resulting from the application of such load to the engine, however that energy is nevertheless energy which would not normally be required or produced during operation of the engine.

A convenient parasitic load can be achieved by coupling an electric load to the alternator normally provided in an engine installation to provide the electrical energy for operation of the engine. Thus the parasitic load may take the form of switching on some or all of the lights in the case of a motor vehicle, or may be in the form of providing heat energy, such as for heating the incoming air to the engine, or for heating the cab or passenger area of a vehicle.

Further, the load on the engine can be increased by restricting the circulation of the cooling water or air to thereby increase the load applied to the engine by the water or air circulation pump or compressor or fan. If the engine is selectively couplable to a compressor such as an air compressor or air conditioning compressor, that compressor may be used to apply the parasitic load to the engine.

The application of a parasitic load in the form of an electric heater element coupled to the engine driven alternator would result in the generation of heat energy. Such heat energy can be usefully applied in heating the air being inducted into the engine thereby raising the temperature of the inducted air, or directly heating the catalyst in the exhaust system. Such useful applications of heat energy will effectively contribute to reducing the period required to light off the exhaust catalyst.

There is thus also provided a management system for an internal combustion engine, characterised in that said system comprises an ECU arranged to receive input signals relating to engine operating conditions to determine the required fueling rate to the engine, engine loading means, and fuel supply means; said ECU being programmed to, at least when the engine is operating under idle and/or low load conditions at a temperature below a predetermined value, control said loading means to apply a parasitic load to the engine to increase engine fuel demand and said fuel supply means to increase fueling rate to the engine in response to said engine fuel demand to thereby raise the rate of increase of the temperature of the engine exhaust gases.

The system of the present invention may comprise fluid circulating means driven by the engine to circulate engine cooling fluid and circulation control means to selectively restrict the circulation of the engine cooling fluid for applying said parasitic load. Alternatively, an electric load means may be coupled to an alternator driven by the engine for applying said parasitic load. The electric load means may preferably include a heater element.

Conveniently, the controlling of the application of the parasitic load and the period of its application is under the control of the ECU which is normally incorporated as part of the management system of most internal combustion engines where fuel efficiency and exhaust emissions are important factors.

Figure 2:
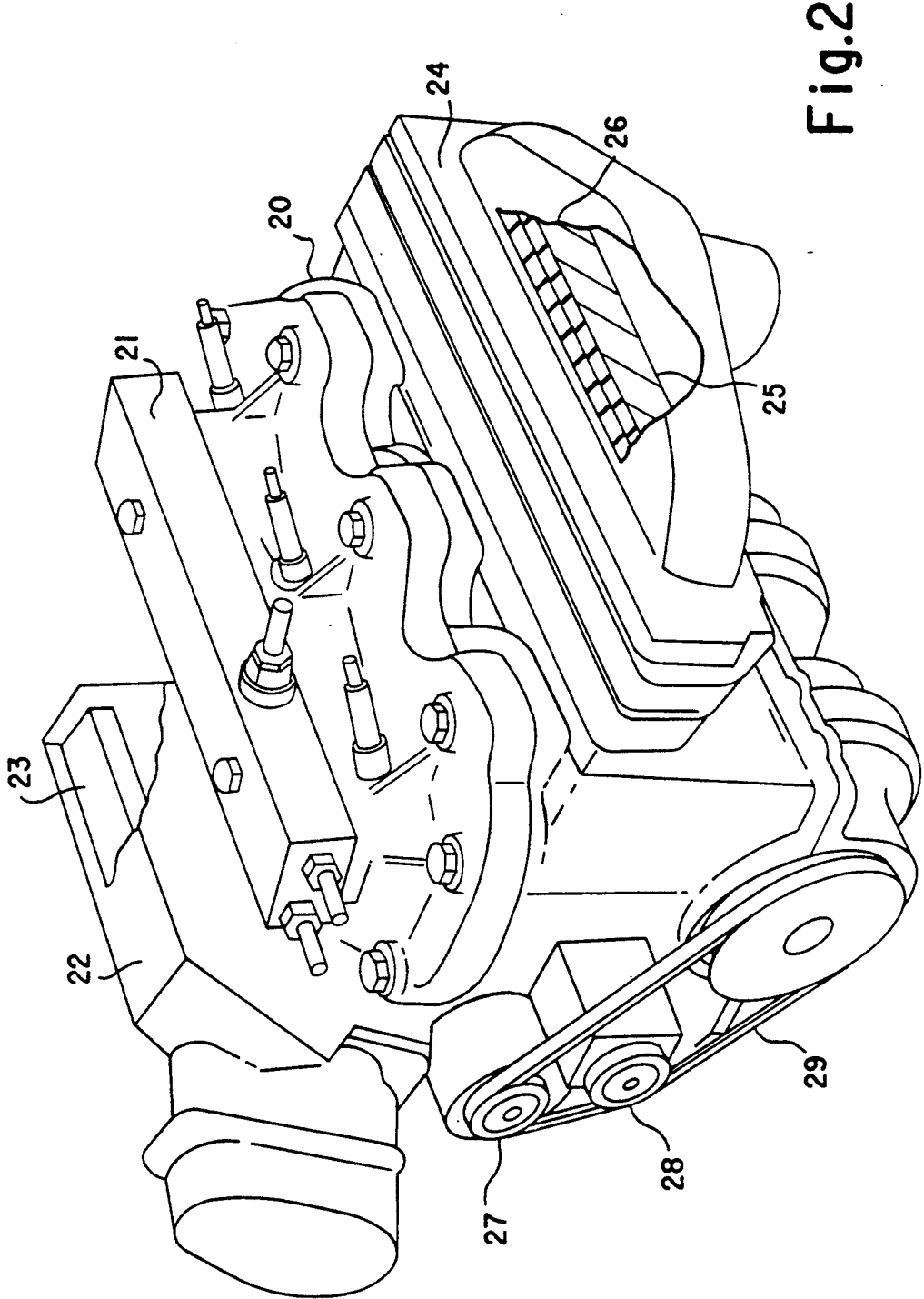

In the accompanying drawings:

FIG. 1 illustrates diagrammatically a convenient arrangement of the ECU and other componentry suitable for carrying out the present invention; and FIG. 2 illustrates an internal combustion engine provided with practical means for carrying out the present invention.

Referring to FIG. 1, the ECU 10 has input signals relating to engine temperature, engine load and engine speed. The power supply to the ECU 10 is from the battery 11 or alternator 12, depending upon the condition of the battery, and output of the alternator as determined by the cut-out 13. The battery 11 is provided as the power supply storage and is charged by the alternator 12, which is driven by the engine.

The relay 15 controls the power supply to the heater element 16 and the relay 15 is controlled by the ECU 10 through the switch 17. The ECU 10 is programmed to determine during the start up procedure whether the engine temperature is below a predetermined value below which it is desirable to provide assistance to obtain an acceptable level of stability of engine operation and rapid light off of the catalyst. A typical predetermined value of temperature is 35° C.

As previously indicated, under some start up conditions, the engine may already be at an effective operating temperature as a result of the engine having not cooled down from a previous period of operation, and in such circumstances the use of a parasitic load to reduce the warm up time is not required. Also if the power supply from the battery 11 is below a preset value, such as 10 volts in a normal 12 volt battery, the ECU 10 will not proceed with the application of an electric, parasitic load since this would be an unacceptable load on the battery 11 and may be detrimental to the operation of the ECU 10.

Where the ECU 10 determines from the battery condition and the engine temperature that a parasitic load should be applied, the ECU 10 activates the relay 15 which will couple the heater element 16 to the alternator 12. The resulting increase in engine load will increase the fuel demand of the engine and the ECU 10 will appropriately increase the fuel supply to the engine. The combustion of the resulting increased amount of the fuel will result in an increase in the temperature of the exhaust gases, which in turn will result in an increased rate of rise of the temperature of the engine and the exhaust catalyst, with a resulting reduction of the time taken to reach stable operation of the engine and to light off the catalyst.

The ECU 10 can be programmed to switch off the parasitic load in accordance with the achieving of a preset condition, which may be the engine reaching a preselected temperature, or may be purely on a time basis, either a real time from start up or a time corresponding to the engine having completed a preselected number of revolutions since start up.

It has been found convenient and desirable to locate the heater element 16 in the path of the air being inducted into the engine so as to increase the temperature of that air as delivered to the combustion chamber, thereby resulting in an increase in the temperature of the subsequently generated exhaust gases.

It has also been found that the heater element 16 can be located in the exhaust system to directly heat the catalyst therein, thereby inducing a quick light off of the catalyst and obtaining effective operation of the exhaust system.

The use of a heater element as a parasitic load has been found to be one of the most convenient forms of load to apply to the engine as the energy from the heater element can also be used advantageously in achieving the more rapid warm up of the engine and raising the temperature of the exhaust gases and inducing rapid light off of the exhaust catalyst.

Referring to FIG. 2, the engine 20 is provided with fuel supply means comprising injector means 21 and has air induction system 22 and exhaust system 24. Air can be inducted into the engine 20 through the air induction system 22 and generated exhaust gases can be treated in the exhaust system 24 for controlling the level of exhaust emissions. Catalyst 25 are provided in the exhaust system 24 for that purpose.

The engine 20 drives alternator 27 and compressor or pump 28 via a belt 29. The alternator 27 provides the electric power for operation of the engine 20 and the pump 28 provides for the circulation of engine cooling fluid. It is appreciated that an increased load on the alternator 27 or the compressor or pump 28 would also result in an increased load on the engine 20.

Electric heater element 23 is located inside the induction system 22 and can be connected as part of an electric load to the alternator 27 for applying a parasitic load to the engine 20. The heater element 23 can be used to apply heat to the inducted air and thus raise the temperature of the inducted air.

Another electric heater element 26 is located inside the exhaust system 24 and can also be connected as part of the electric load to the alternator 27 for applying a parasitic load to the engine 20. The heater element 26 can be used to directly heat the catalyst 25 in the exhaust system 24 and induce quick light off of the catalyst for the effective operation of the exhaust system.

The pump 28 may be fitted with circulation control means in the form of a variable opening valve or adjustable vent for selectively restricting the circulation of the engine cooling fluid. Such restriction would result in an increased load on the pump 28 and therefore an increased load to the engine 20.

The claims defining the invention are as follows:

I claim:

1. A method of operating an internal combustion engine, characterised by, at least when the engine is operating under idle and/or low load conditions, determining when the engine temperature is below a predetermined value, automatically applying a parasitic load to the engine in response to determining said engine temperature is below said predetermined value to thereby increase the engine fuel demand, and increasing fuelling rate to the engine in response to said increased engine fuel demand to thereby raise the temperature of the exhaust gas.

2. A method according to claim 1, characterised in that the parasitic load is applied by restricting the circulation of engine cooling fluid by fluid circulating means driven by the engine.

3. A method according to claim 1, characterised in that the parasitic load is applied by coupling an electric load to an alternator driven by the engine.

4. A method according to claim 3, characterised in that said electric load includes a heater element.

5. A method according to claim 4, characterised by applying the heat generated by said heater element to raise the temperature of the air being inducted into the engine.

6. A method according to claim 4, characterised by applying the heat generated by said heater element to directly heat a catalyst in the engine exhaust system.

7. A method according to claim 1, further characterised by raising the temperature of the air being inducted into the engine.

8. A method according to claim 1, further characterised by directly heating a catalyst in the engine exhaust system.

9. A management system for an internal combustion engine, characterised in that said system comprises an ECU arranged to receive input signals relating to engine operating conditions to determine the required fuelling rate to the engine, engine loading means, and fuel supply means; said ECU being programmed to, at least when the engine is operating under idle and/or low load conditions, determine when the engine temperature is below a predetermined value, control said loading means to apply a parasitic load to the engine in response to determining said engine temperature is below said predetermined value to thereby increase the engine fuel demand and adjust said fuel supply means to increase fuelling rate to the engine in response to said engine fuel demand to thereby raise the temperature of the engine exhaust gases.

10. A system according to claim 9, characterised in that said loading means include fluid circulating means driven by the engine to circulate engine cooling fluid and circulation control means to selectively restrict the circulation of the engine cooling fluid for applying said parasitic load.

11. A system according to claim 9, characterised in that said loading means include an electric load means coupleable to an alternator driven by the engine for applying said parasitic load.

12. A system according to claim 11, characterised in that said electric load means includes a heater element.

13. A system according to claim 12, characterised in that said heater element is arranged to raise the temperature of the air being inducted into the engine.

14. A system according to claim 12, characterised in that said heater element is arranged to directly heat a catalyst in the engine exhaust system.

15. A system according to claim 11, characterised in that the ECU is powered from an electric energy storage coupled to an alternator driven by the engine, said ECU is programmed to only apply said electric load when the level of said storage is above a preset value.

16. A system according to claim 9, characterised in that the ECU is programmed to control the period of the application of the parasitic load.

17. A system according to claim 16, characterised in that the period is determined by the operating temperature of the engine.

18. A system according to claim 16, characterised in that the period is determined by the number of revolutions from the engine start up.

19. A system according to claim 16, characterised in that the period is determined by a preselected time interval from the engine start up.

20. A system according to claim 9, characterised in that the input signals relate to the engine temperature, engine load and engine speed.

21. A system according to claim 9, characterised in that a heater element is provided to raise the temperature of the air being inducted into the engine.

22. A system according to claim 9, characterised in that a heater element is provided to directly heat a catalyst in the engine exhaust system.

* * * * *